June 4, 1968  J. H. JUDD  3,386,685
SPACECRAFT AIRLOCK
Filed July 26, 1966  3 Sheets-Sheet 1
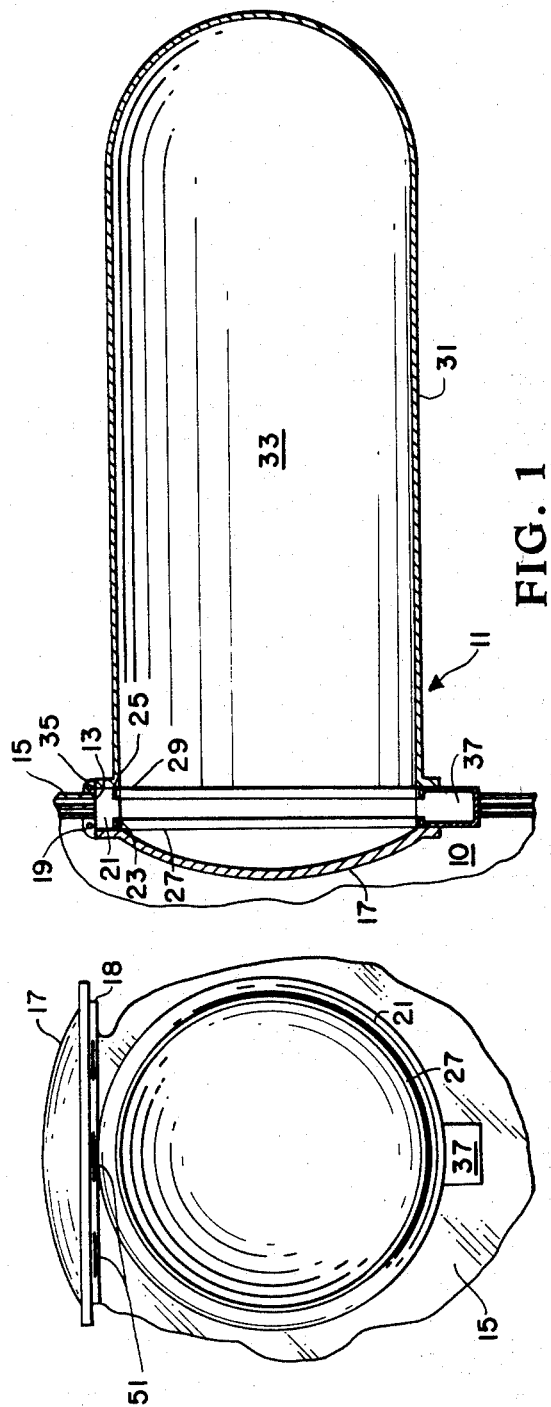
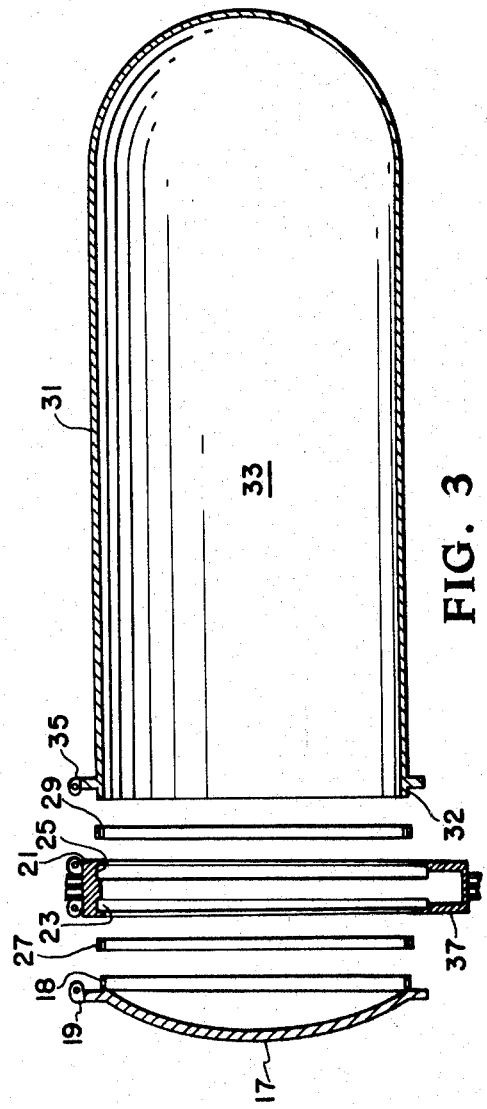
INVENTOR
JOSEPH H. JUDD
BY
ATTORNEYS June 4, 1968  J. H. JUDD  3,386,685
SPACECRAFT AIRLOCK
Filed July 26, 1966  3 Sheets-Sheet 2

INVENTOR
JOSEPH H. JUDD

BY
ATTORNEYS

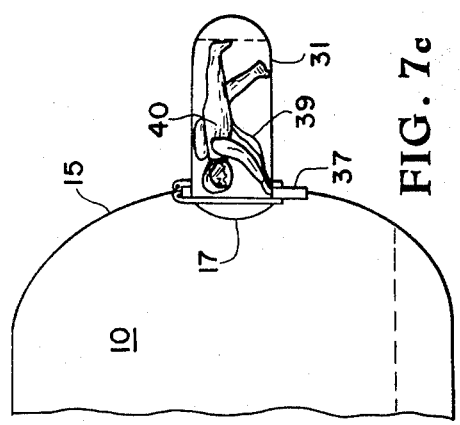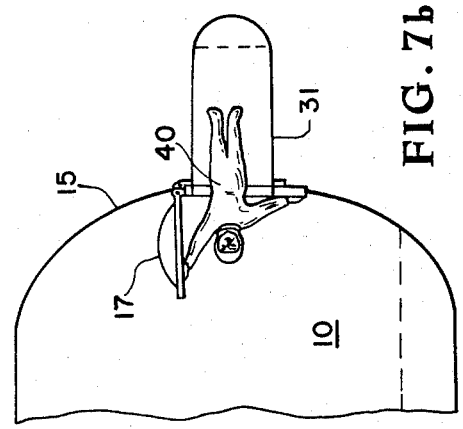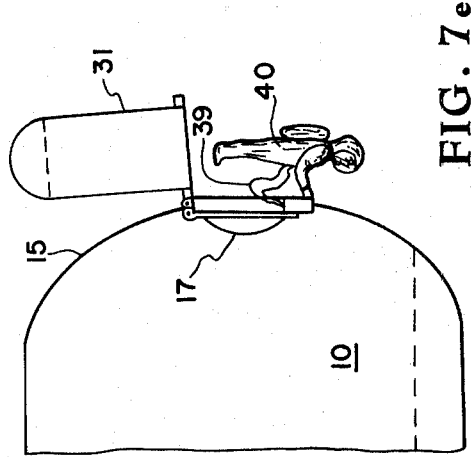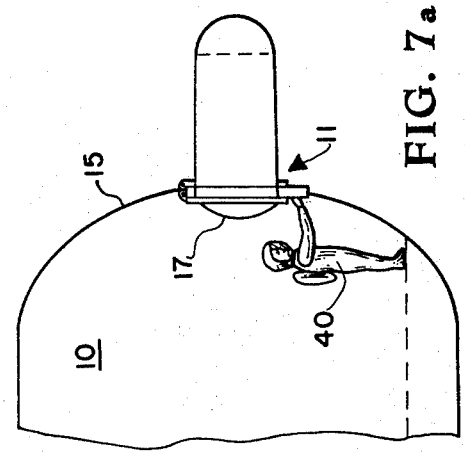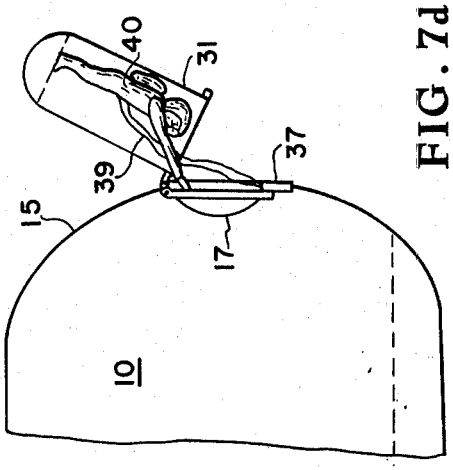

United States Patent Office 3,386,685
Patented June 4, 1968

3,386,685
SPACECRAFT AIRLOCK
Joseph H. Judd, Newport News, Va., assignor to the United States of America as represented by the Administrator of the National Aeronautics and Space Administration
Filed July 26, 1966, Ser. No. 568,067
6 Claims. (Cl. 244—1)

ABSTRACT OF THE DISCLOSURE

An airlock permitting individual ingress and egress between one area of environment and another area of environment without subjecting the two areas to each other.

This invention was made by an employee of the United States Government and may be manufactured or used by or for the Government without the payment of any royalties thereon or therefor.

This invention relates generally to an airlock assembly employed to enable an individual to go from one area of air concentration to another area of air concentration and relates particularly to a spacecraft airlock which permits an occupant of the spacecraft to safely remove himself from the vehicle when the space vehicle is in a spatial environment without subjecting the vehicular environment to the vacuum of space.

It is contemplated that in the near future multi-occupant orbiting research space vehicles will be employed about the earth and other planetary bodies in our ever expanding exploration into the unknowns of space. These multi-occupant vehicles will be provided with an air pressure essentially equal to the normal earth atmosphere to permit maximum utilization of the vehicle crew and for minimum discomfort to the crew members while performing their assigned space mission. These contemplated large spacecraft thus will require provision therein to permit occupant ingress and egress from the vehicle for transporting perishable supplies, changing vehicle crews, and conducting individual extra-vehicular experimentations in the spatial environment. Extra-vehicular activity experiments have already been conducted by both the United States and Russian astronauts from relatively small orbiting spacecraft. These limited "space walks" have proved to be relatively simple since it was possible to depressurize the entire spacecraft to essentially that of the spatial environment prior to the astronaut leaving the vehicle so that there was no substantial change in pressure between the two areas during astronaut movement. In these systems all crew members must then work in pressurized space suits, however, which presents some problems. Obviously, this procedure would not be possible in a large multi-occupant space vehicle since the weight requirements for the pressurizing and depressurizing equipment required onboard such large spacecraft would constitute a large portion of the payload therein at the expense of other valuable equipment that will be needed for these long term missions.

In addition, since it is desirable that the astronauts on long term missions be able to work in a shirtsleeve environment, depressurizing of the entire vehicle, which would require the use of individual space pressure suits for all occupants is substantially impractical. It is therefore imperative that a system be devised that will permit astronaut ingress and egress between the spacecraft pressurized area and the vacuum of space without subjecting the two areas of air concentration to each other. The airlock of the present invention will permit safe self-locomotive occupant movement between an area of first environment and an area of second environment without subjecting either of the areas to each other and thus fulfills this definite need in the art.

Airlocks, alone, are not new since they have been employed to go from atmospheric pressure to containers of either higher or lower pressure air or to pass from an air atmosphere to water or a poisonous gas environment, and back again. These prior art airlocks employed a small room with two doors, one opening to one environment and the other opening to a second environment, with pumps, valves and other devices enabling the room atmosphere to gradually be made the same as that which the operator desires to enter. The disadvantages of these prior art systems is that the excessive weight and mechanical complexity associated therewith renders them impractical for use in space vehicles. Thus, the present invention attempts to combine the advantageous features of the prior art systems while eliminating the disadvantages thereof by providing a new and novel airlock system capable of use in large multi-occupant space vehicles employable for long term space flights.

Accordingly, an object of the present invention is a new and novel airlock for a space vehicle.

Another object of the present invention is a novel airlock for a space vehicle permitting an occupant to safely remove himself from the vehicle when in a spatial environment without subjecting the vehicular environment to the spatial environment.

Another object of the present invention is a novel system permitting an astronaut to safely go from a spacecraft at a pressure sufficient to sustain life into the vacuum of space.

Another object of the present invention is a novel airlock chamber having only one open end and of reduced size and complexity in comparison with known airlocks.

Yet another object of the present invention is a readily removeable airlock compartment that is easily replaced in the event of structure damage or degradation.

A further object of the present invention is an airlock system requiring a minimum expenditure of energy by an individual when going from one area of air concentration to another area of air concentration.

In accordance with the present invention, the foregoing and other objects are attained by providing a spacecraft having an opening in the wall thereof, with internal and external closure doors being provided for the opening. Each of the internal and external closure doors alone are adequate to hermetically seal the opening once the doors are closed and latched. A compartment of adequate size to accommodate a human occupant is formed in one of the closure doors to thereby permit astronaut ingress and egress through the spacecraft wall opening. A control panel, accessible both from the interior and exterior of the space vehicle, as well as from the compartment in the closure door, is provided to give the astronaut selective control over the environment in the door compartment.

A more complete appreciation of the invention and many of the attendant advantages thereof will be readily appreciated as the same becomes better understood by reference to the following detailed description when considered in connection with the accompanying drawings wherein:

FIG. 1 is a part sectional view of a spacecraft employing an airlock according to the present invention;

FIG. 2 is a schematic view looking from the spacecraft interior with the interior airlock door opened;

FIG. 3 is an exploded sectional view of the airlock component parts shown in FIG. 1;

FIGS. 7a–7e illustrate the sequence of events in a normal astronaut egress from a spacecraft when employing the airlock of the present invention.

Figure 4:
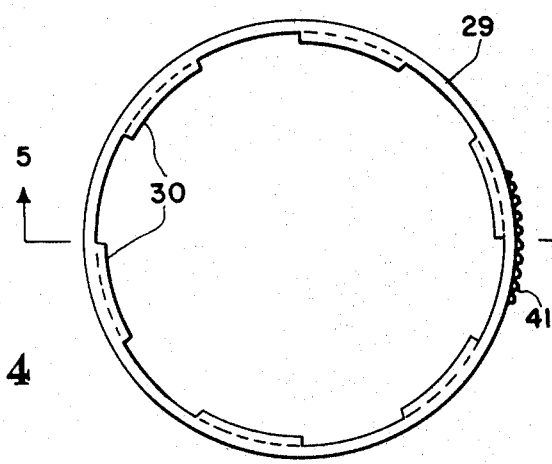
FIG. 4 is a plan view of one of the locking rings employed in the present invention.

Referring now to the drawings wherein like numerals designate identical or corresponding parts throughout the several views, and more particularly to FIG. 1, a segment of a space vehicle 10 is shown having an airlock, generally designated by reference numeral 11 therein. Airlock 11 is secured within an opening 13 of the space vehicle wall 15 and includes an interior closure door 17 and an exterior closure door 31. Interior closure door 17 is connected by hinge 19, and exterior door 31 is connected by hinge 35, to a space station wall flange 21. Flange 21 is of annular configuration and is rigidly secured within opening 13 of spacecraft wall 15. A pair of circumferential grooves 23 and 25 are provided along the interior diameter of flange 21 for receiving locking and latching rings 27 and 29, respectively.

As shown more particularly in FIG. 3, doors 17 and 31 are provided with rims 18 and 32, respectively, which are adapted to be received by locking and latching rings 27 and 29, respectively, to secure the doors, hermetically sealed, in closed position. Exterior door 31 is also provided with an elongated compartment 33 of adequate size as to accommodate an individual therein. A centrally disposed airlock control box or panel 37 is secured to flange 21 in such position as to be accessible from both the interior and exterior of the space vehicle wall 15, as well as accessible from the compartment 33 of closure door 31, as will be more fully explained hereinafter.

Control box 37 contains identical controls on each of three faces for permitting selective actuation by an occupant of the space vehicle to latch and unlatch each of doors 17 and 31, and to actuate air and vacuum lines (not shown) leading to compartment 33. In addition, suitable hook-up mechanism (not shown) is provided on control box 37 for any umbilical-type lines that may be needed by an individual astronaut while outside of vehicle 10.

Referring now more particular to FIG. 2, a prospective view of the airlock assembly, as viewed from the interior of the spacecraft with interior closure door 17 in the open position, is shown. As shown in this figure airlock control box 37 is readily accessible to an occupant of the vehicle from the interior of the spacecraft.

The individual components of the airlock assembly are shown more clearly in the exploded sectional view of FIG. 3.

Figure 5:
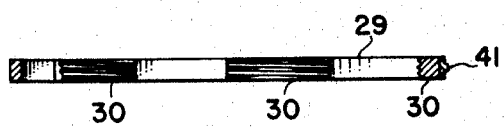
FIG. 5 is a view taken along line 5—5 of FIG. 4.
Figure 6:
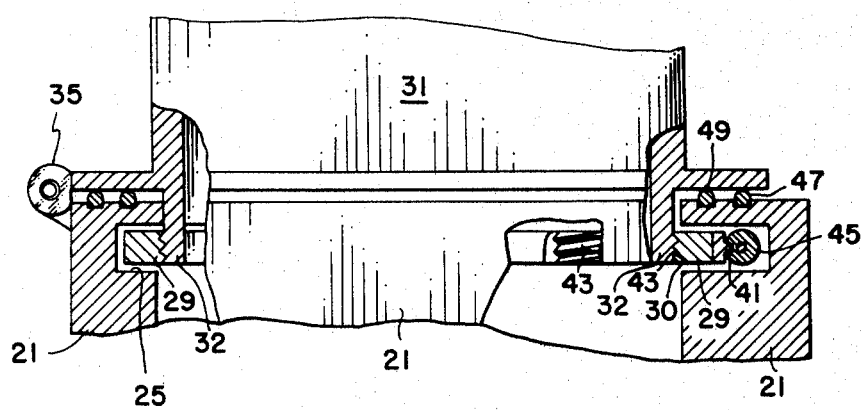
FIG. 6 is a part sectional, part plan view, with portions omitted, illustrating the operation of one of the lock rings of the present invention.

The locking and latching mechanism is best understood by reference to FIGS. 4–6. As shown therein, ring 29 is provided with female buttress thread segments 30 disposed along the interior thereof and a gear segment 41 along a portion of the exterior diameter. Door 31 is provided with male buttress thread segments 43 disposed exteriorly on rim 32 (FIG. 6). A wormscrew 45 is provided in flange 21 in operative connection with gear segment 41. Thus, to latch door 31, worm 45 is actuated by a suitable electric motor hand crank or the like, to rotate ring 29. The rotation of ring 29 causes thread segments 30 and 43 to become engaged and door 31 is drawn into tight abutting relationship with flange 21. Suitable O-ring seals 47 and 49 disposed in the face of flange 21 are compressed between door 31 and flange 21 to provide a hermetic seal therebetween. Locking of door 31 is accomplished passively by the friction between gear segment 41 and wormscrew 45.

Locking and latching of interior door 17 is accomplished in identical fashion as door 31 with ring 27 being of identical construction as ring 29 and provided with a separate worm drive mechanism, gear segments, seals, and the like. The details of the lock and latch mechanism for door 17, other than gear segments 51 located on rim 18 (FIG. 2) have, accordingly, been omitted in the interest of clarity, it being understood that the controls for wormscrew 45 and the wormscrew for turning ring 27, not shown, are also disposed on each face of control panel 37.

*Operation*

For the purposes of providing a better understanding of the operation of the present invention, the operation thereof during a normal egress movement from a space vehicle 10 will now be described in relation to FIGS. 7a–7e.

During the space flight when it is desirable or necessary that an occupant 40 of space vehicle 10 leave the space vehicle he will actuate the controls on control box 37 (FIG. 7a) to pressurize the airlock compartment 33 to essentially the same pressure as that within vehicle 10, and then unlock interior closure door 17. Astronaut 40 then opens door 17 (FIG. 7b) and enters compartment 33, feet first. After entering compartment 33 (FIG. 7c), the astronaut closes inside door 17, locks it, and actuates the controls from control panel 37 to evacuate or depressurize the airclock compartment 37 before finally unlocking outside door 31. After latching door 17, and before decompressing compartment 33, any necessary umbilical lines 39 for life support of astronaut 40 in his space suit outside the space vehicle 10 are attached to suitable connections, not shown, on control panel 37. Compartment 33 is then evacuated or depressurized, by actuating suitable controls on control panel 37, door 31 unlocked and (FIG. 7d) astronaut 40 manually pushes door 31 open with the door pivoting about its hinge 35. Astronaut 40 then crawls or pushes himself from compartment 33 (FIG. 7e) and performs the desired or nec-completion of the extra vehicular activity astronaut 40 may reenter space vehicle 10 by the reverse procedure of that described for his exit from the vehicle.

It is thus seen that by the use of the present invention an individual occupant of a space vehicle can safely go from a spacecraft at a pressure sufficient to sustain life into the vacuum of space without subjecting the space vehicle environment to the spatial environment. In the interest of clarity, various pumps, valves and other controls necessary to be actuated through control panel 37 have been omitted from the description herein although it is understood that such mechanism would be required with use of the present invention to enable the selective interchangeability of the air pressure environment in compartment 31 between that of the vacuum of space, and an air pressure sufficient to sustain life as would normally be maintained within space vehicle 10. In addition, it is readily apparent that all control elements, that is, the necessary valves, motors and pumps controlled by control panel 37 are positioned within the spacecraft to facilitate service and repair thereof, as needed.

It is thus seen that by use of the present invention the crew for spacecraft 10 may be exchanged from one space vehicle to another, such for example as the interchange of a crew from a carrier vehicle to an orbiting research laboratory, the airlock described herein may be used for transporting individual stores to and from spacecraft 10, and for other extra vehicular activity, such for example as making repairs to space vehicle 10 when needed in the environment of space without depressurizing the entire space vehicle 10.

In addition to the inherent advantages of this invention as pointed out hereintofore, it is readily seen that doors 17 and 31 are easily replaceable in the event of structural damage or degradation thereof. This is accomplishable by merely removing the hinge pin connection in the respective hinges 19 and 35, this being the only positive connection of the doors to flange 21.

Although a specific embodiment of the invention has been described, there are obviously numerous modifications and variations of the present invention within the light of the above teachings. For example, both interior closure door 17 and exterior closure door 31 may be of elongated configuration to thereby form a compartment in each door of adequate size to house an occupant therein, or only the interior closure door may contain the compartment instead of the exterior closure door as described herein where the aerodynamic qualities for space vehicle 10 might so dictate when placing a large space vehicle into orbit by booster rockets. In addition, although the closure door 31 as illustrated, is of rigid construction, it is readily apparent that door 31 could be made of any suitable expandible configuration, such for example a bellows type arrangement, to permit collapse of the bulk of the door adjacent or within space vehicle 10 when so desired. It is also within the scope of the present invention to employ other known types of retracting and collapsible-erection mechanism for compartment 33 when so desired.

Although the present invention has been described in specific relationship to an airlock for spacecraft, it is readily apparent that it is equally applicable for use in underwater craft and the like with minor modification being required only in the controls actuated by control panel 37. It is therefore to be understood that within the scope of the appended claims the invention may be practiced otherwise than as specifically described.

What is claimed as new and desired to be secured by Letters Patent of the United States is:

1. An airlock for a space vehicle comprising:
    an opening in the wall of said space vehicle,
    internal and external closure doors for said opening,
    each said internal and said external closure door alone adequate hermetically sealing said opening,
    said internal closure door being hingedly connected to the space vehicle wall and selectively openable into said vehicle,
    said exterior closure door being hingedly connected to the space vehicle wall and selectively openable toward the exterior of said vehicle, and
    said exterior door including means forming a compartment therein of sufficient size as to accommodate an occupant therein, means for selectively exchanging the environment in said compartment between that within said vehicle and the ambient vehicle environment, said last mentioned means being accessible to an occupant of said vehicle while in said vehicle, while in said external door compartment and while exteriorly adjacent to said exterior door.

2. An airlock as in claim 1 including control means operable by said space vehicle occupant for selectively opening and securing of each of said closure doors.

3. An airlock as in claim 2 wherein said control means are accessible to said occupant while he is in said space vehicle, while in said external door compartment and while exteriorly adjacent to said exterior door.

4. An airlock permitting individual ingress and egress between one area of environment and another area of environment without subjecting said areas to each other, comprising:
    an enclosure having a wall and enclosing one of said environments,
    an opening in said wall leading from said one area to said other area,
    a closure for said opening,
    said closure including:
        (a) an internal door hingedly connected to said wall adjacent said one area, and
        (b) an external door hingedly connected to said wall adjacent said other area,
    said external door comprising an open-ended, elongated compartment of sufficient size as to accommodate a human occupant therein,
    first means for selectively opening and closing said internal door, second means for selectively opening and closing said external door, said first and second means being in contiguous relationship to said open end of said elongated compartment.

5. An airlock as in claim 4 including:
    control means for selectively exchanging the environment in said compartment between that of said one area and that of said other area.

6. Means permitting safe self-locomotive occupant movement between an area of first environment and an area of second environment comprising:
    an enclosure housing said area of first environment and including a wall,
    a commutable opening in said enclosure wall leading to said area of second environment,
    closure means for said opening,
    said closure means including a first door and a second door spaced from said first door,
    said first door hingedly disposed on the interior of said housing wall and adapted for opening interiorly of said housing,
    said second door being hingedly disposed on the exterior of said housing wall and adapted for opening exteriorly of said housing,
    said exterior door including an elongated airlock compartment of at least sufficient size as to accommodate an occupant therein,
    control means operable by the occupant for effecting selective locking, latching and opening of each of said first and second doors,
    said control means including a control panel adjacent said hatch means accessible to said occupant from the housing interior and exterior, and from said airlock compartment,
    environment selection means for selectively changing the environment within said airlock compartment between that of said first and said second environmental areas,
    whereby when an occupant of said enclosure housing desires to move from said area of first environment to said area of second environment without subjecting said environments to each other the occupant may actuate said control means to unlatch and open said first door, transpose himself through said hatch means into said airlock compartment, close said first door to thereby isolate himself from said housing interior, actuate said environmental selection means to change the environment in said airlock compartment from that of said first area environment to that of said second area environment, actuate said control means to unlatch and open said exterior door and remove himself from said compartment to said area of second environment.

References Cited

UNITED STATES PATENTS

| | | | |
|---|---|---|---|
| 1,026,458 | 5/1912 | Roth | 114—16.7 |
| 2,869,749 | 1/1959 | Arne et al. | 220—1 |
| 3,169,725 | 2/1965 | Berglund | 244—1 |
| 3,286,952 | 11/1966 | Seeler | 244—1 |
| 3,332,640 | 7/1967 | Nesheim | 244—1 |

FERGUS S. MIDDLETON, *Primary Examiner.*

B. BELKIN, *Assistant Examiner.*